US012443267B2

(12) United States Patent
Hoof et al.

(10) Patent No.: US 12,443,267 B2
(45) Date of Patent: *Oct. 14, 2025

(54) SILHOUETTE-BASED LIMB FINDER DETERMINATION

(71) Applicant: Microsoft Technology Licensing, LLC, Redmond, WA (US)

(72) Inventors: Jonathan R. Hoof, Bellevue, WA (US); Daniel G. Kennett, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 410 days.

This patent is subject to a terminal disclaimer.

(21) Appl. No.: 17/159,761

(22) Filed: Jan. 27, 2021

(65) Prior Publication Data

US 2021/0149478 A1    May 20, 2021

Related U.S. Application Data

(63) Continuation of application No. 14/518,089, filed on Oct. 20, 2014, now Pat. No. 10,921,877.

(51) Int. Cl.
*G06F 3/01* (2006.01)
*A63F 13/213* (2014.01)
*A63F 13/25* (2014.01)
*A63F 13/428* (2014.01)
*G06T 7/13* (2017.01)

(52) U.S. Cl.
CPC ............ *G06F 3/011* (2013.01); *A63F 13/213* (2014.09); *A63F 13/25* (2014.09); *A63F 13/428* (2014.09); *G06T 7/13* (2017.01); *G06T 2207/20041* (2013.01); *G06T 2207/20044* (2013.01); *G06T 2207/30172* (2013.01); *G06T 2207/30196* (2013.01)

(58) Field of Classification Search
CPC ........ G06F 3/011; A63F 13/25; A63F 13/428; G06T 7/13
See application file for complete search history.

(56) References Cited

U.S. PATENT DOCUMENTS

| | | | | |
|---|---|---|---|---|
| 6,141,463 A | * | 10/2000 | Covell | ........................ G06T 7/70 |
| | | | | 345/473 |
| 2011/0293137 A1 | * | 12/2011 | Gurman | ..................... G06T 7/11 |
| | | | | 382/103 |

OTHER PUBLICATIONS

Decision to Grant Issued in European Patent Application No. 15788274.7, mailed on Jun. 12, 2020, 2 Pages.
Notice of Allowance Issued in Chinese Patent Application No. 201580057019.2, mailed on Aug. 5, 2020, 4 Pages.
Notice of Allowance Issued in European Patent Application No. 15788274.7, mailed on Jan. 31, 2020, 7 Pages.

* cited by examiner

*Primary Examiner* — Thomas H Henry

(57) ABSTRACT

A silhouette-based limb finder may be used to detect limbs from a camera image. This limb determination may be used to control an application, such as a game, or a combination with other image processing. A first distance field indicating a distance from the edge of a silhouette in an image and a second distance field indicating distance from a location in the silhouette may be used to generate a path from an extremity point on the silhouette to the location. This path then may be used to determine a limb in the silhouette. This allows tracking of limbs even for hard to detect player poses.

20 Claims, 14 Drawing Sheets

|   |   |   |   |   |   |   |
|---|---|---|---|---|---|---|
| - | - | - | - | - | - | - |
| - | 1 | 1 | 1 | 1 | 1 | - |
| - | 1 | 1 | 1 | 1 | 1 | - |
| - | 1 | 1 | 1 | 1 | 1 | - |
| - | 1 | 1 | 1 | 1 | 1 | - |
| - | 1 | 1 | 1 | 1 | 1 | - |
| - | - | - | - | - | - | - |

FIG.6A

|   |   |   |   |   |   |   |
|---|---|---|---|---|---|---|
| - | - | - | - | - | - | - |
| - | 1 | 1 | 1 | 1 | 1 | - |
| - | 1 | 2 | 2 | 2 | 1 | - |
| - | 1 | 2 | 3 | 2 | 1 | - |
| - | 1 | 2 | 2 | 2 | 1 | - |
| - | 1 | 1 | 1 | 1 | 1 | - |
| - | - | - | - | - | - | - |

FIG.6B

|   |   |   |   |   |   |   |
|---|---|---|---|---|---|---|
| - | - | - | - | - | - | - |
| - | 2 | 1 | 1 | 1 | 2 | - |
| - | 2 | 1 | * | 1 | 2 | - |
| - | 2 | 1 | 1 | 1 | 2 | - |
| - | 2 | 2 | 2 | 2 | 2 | - |
| - | 3 | 3 | 3 | 3 | 3 | - |
| - | - | - | - | - | - | - |

FIG.6C

| - | - | 1 | 1 | 1 | 1 | 1 | 1 | 1 | 1 | 1 | 1 | 1 | - |
|---|---|---|---|---|---|---|---|---|---|---|---|---|---|
| - | - | 1 | 1 | 1 | 1 | 1 | 1 | 1 | 1 | 1 | 1 | - | - |
| - | 1 | 1 | 1 | 1 | 1 | 1 | 1 | 1 | 1 | 1 | 1 | 1 | - |
| - | 1 | 1 | 1 | 1 | 1 | 1 | 1 | 1 | 1 | 1 | 1 | - | - |
| - | - | 1 | 1 | 1 | 1 | 1 | 1 | 1 | 1 | 1 | 1 | - | - |
| - | - | - | - | 1 | 1 | 1 | 1 | 1 | 1 | 1 | 1 | - | - |
| - | - | 1 | 1 | 1 | 1 | 1 | 1 | 1 | 1 | 1 | 1 | - | - |
| - | - | - | 1 | 1 | 1 | 1 | 1 | 1 | 1 | 1 | - | - | - |
| - | - | - | 1 | 1 | 1 | 1 | 1 | 1 | 1 | 1 | - | - | - |
| - | - | - | - | 1 | 1 | 1 | 1 | 1 | 1 | 1 | - | - | - |
| - | - | - | - | - | 1 | 1 | 1 | 1 | 1 | - | - | - | - |
| - | - | - | - | - | - | 1 | 1 | 1 | - | - | - | - | - |
| - | - | - | - | - | - | - | - | - | - | - | - | - | - |
| - | - | - | - | - | - | - | - | - | - | - | - | - | - |

FIG.8A

| - | - | 1 | 2 | 3 | 4 | 5 | 6 | 5 | 4 | 3 | 2 | 1 | - |
|---|---|---|---|---|---|---|---|---|---|---|---|---|---|
| - | - | 1 | 2 | 3 | 4 | 5 | 5 | 4 | 3 | 2 | 1 | - | - |
| - | 1 | 2 | 3 | 4 | 5 | 6 | 6 | 5 | 4 | 3 | 2 | 1 | - |
| - | 1 | 2 | 3 | 4 | 5 | 5 | 4 | 3 | 2 | 2 | 1 | - | - |
| - | - | 1 | 1 | 2 | 4 | 5 | 5 | 4 | 3 | 2 | 1 | - | - |
| - | - | - | - | 1 | 2 | 3 | 4 | 4 | 3 | 2 | 1 | - | - |
| -- | - | 1 | 1 | 2 | 3 | 4 | 5 | 4 | 3 | 2 | 1 | - | - |
| - | - | - | 1 | 2 | 3 | 4 | 4 | 3 | 2 | 1 | - | - | - |
| - | - | - | 1 | 2 | 3 | 4 | 4 | 3 | 2 | 1 | - | - | - |
| - | - | - | - | 1 | 2 | 3 | 3 | 3 | 2 | 1 | - | - | - |
| - | - | - | - | - | 1 | 2 | 2 | 2 | 1 | - | - | - | - |
| - | - | - | - | - | - | 1 | 1 | 1 | - | - | - | - | - |
| - | - | - | - | - | - | - | - | - | - | - | - | - | - |
| - | - | - | - | - | - | - | - | - | - | - | - | - | - |

FIG.8B

| - | - | 63 | 62 | 61 | 60 | 59 | 58 | 57 | 56 | 55 | 54 | 53 | - |
|---|---|---|---|---|---|---|---|---|---|---|---|---|---|
| - | - | 64 | 63 | 62 | 61 | 60 | 59 | 58 | 57 | 56 | 55 | - | - |
| - | 66 | 65 | 64 | 63 | 62 | 61 | 60 | 59 | 58 | 57 | 56 | 57 | - |
| - | 67 | 66 | 65 | 64 | 63 | 62 | 61 | 60 | 59 | 58 | 57 | - | - |
| - | - | 67 | 66 | 65 | 64 | 63 | 62 | 61 | 60 | 59 | 58 | - | - |
| - | - | - | - | 66 | 65 | 64 | 63 | 62 | 61 | 60 | 59 | - | - |
| -- | - | 69 | 68 | 67 | 66 | 65 | 64 | 63 | 62 | 61 | 60 | - | - |
| - | - | - | 69 | 68 | 67 | 66 | 65 | 64 | 63 | 62 | - | - | - |
| - | - | - | 70 | 69 | 68 | 67 | 66 | 65 | 64 | 63 | - | - | - |
| - | - | - | - | 70 | 69 | 68 | 67 | 66 | 65 | 64 | - | - | - |
| - | - | - | - | - | 70 | 69 | 68 | 67 | 66 | - | - | - | - |
| - | - | - | - | - | - | 70 | 69 | 68 | - | - | - | - | - |
| - | - | - | - | - | - | - | - | - | - | - | - | - | - |
| - | - | - | - | - | - | - | - | - | - | - | - | - | - |

FIG.8C

SILHOUETTE-BASED LIMB FINDER DETERMINATION

CROSS-REFERENCE TO RELATED APPLICATIONS

This application is a continuation of U.S. patent application Ser. No. 14/518,089, filed Oct. 20, 2014, issued as U.S. Pat. No. 10,921,877, the disclosure of which is hereby incorporated herein by reference in its entirety.

BACKGROUND

Many computing applications, such as computer games, use controllers to provide input. Typically, controllers are used to control an object or character in the application. Recently, cameras have been used to allow users to control game characters or other aspects of an application without the need for conventional handheld game controllers. Such camera-based controllers may identify users captured by cameras, and detect motion or other behaviors of the users.

SUMMARY

A silhouette-based limb finder may be used to detect limbs from a camera image. This limb determination may be used to control an application, such as a game, by itself or in combination with other image processing.

A silhouette may be the portion of a camera image associated with an object, such as a person, in the camera image. The silhouette may be obtained from the output of a segmentation process that identifies objects in the camera image.

A first distance field indicating a distance from the edge of a silhouette along with a second distance field indicating distance from a location in the silhouette may be used to generate a path from an extremity point on the silhouette to the location. This path then may be used to determine a limb in the silhouette. This may allow tracking of limbs even for player poses that are not well suited for skeletal tracking techniques.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 6A illustrates a simplified example of a silhouette.

FIG. 6B illustrates a simplified example of a first distance field showing distance from an edge for the simplified silhouette of FIG. 6A.

FIG. 6C illustrates a simplified example of a second distance field showing distance from a location in a silhouette for the simplified silhouette of FIG. 6A.

FIG. 8A illustrates an example of a portion of a silhouette.

FIG. 8B illustrates an example of a first distance field showing distance from a silhouette edge for the portion of a silhouette shown in FIG. 8A.

FIG. 8C illustrates a simplified example of a second distance field showing distance from a location in a silhouette for the portion of a silhouette of FIG. 8A.

DETAILED DESCRIPTION OF ILLUSTRATIVE EXAMPLES

Camera based controllers may rely on skeletal tracking (ST) techniques to detect motion or other user behaviors. ST techniques may locate the joints of the tracked users in space and track their movements over time. ST techniques are typically developed based on machine learning and are thus most effective when used with user poses similar to the poses in the training set. For example, ST often works best to detect users standing or sitting, and facing the camera. ST techniques are less reliable for detecting other types of user behaviors. For example, ST techniques are typically unreliable for detecting poses where the user is contorted, near the floor, or in a sideways position with respect to the camera. Limb finder determination using two distance fields may allow for tracking of the user in such unusual positions.

Although the following describes a gaming console example in detail, it is to be understood that the limb finder method may be done on other devices including Personal Computers (PCs), and hand held devices, such as smart phones. The limb finder method may be used for non-gaming applications as well.

Figure 1A:
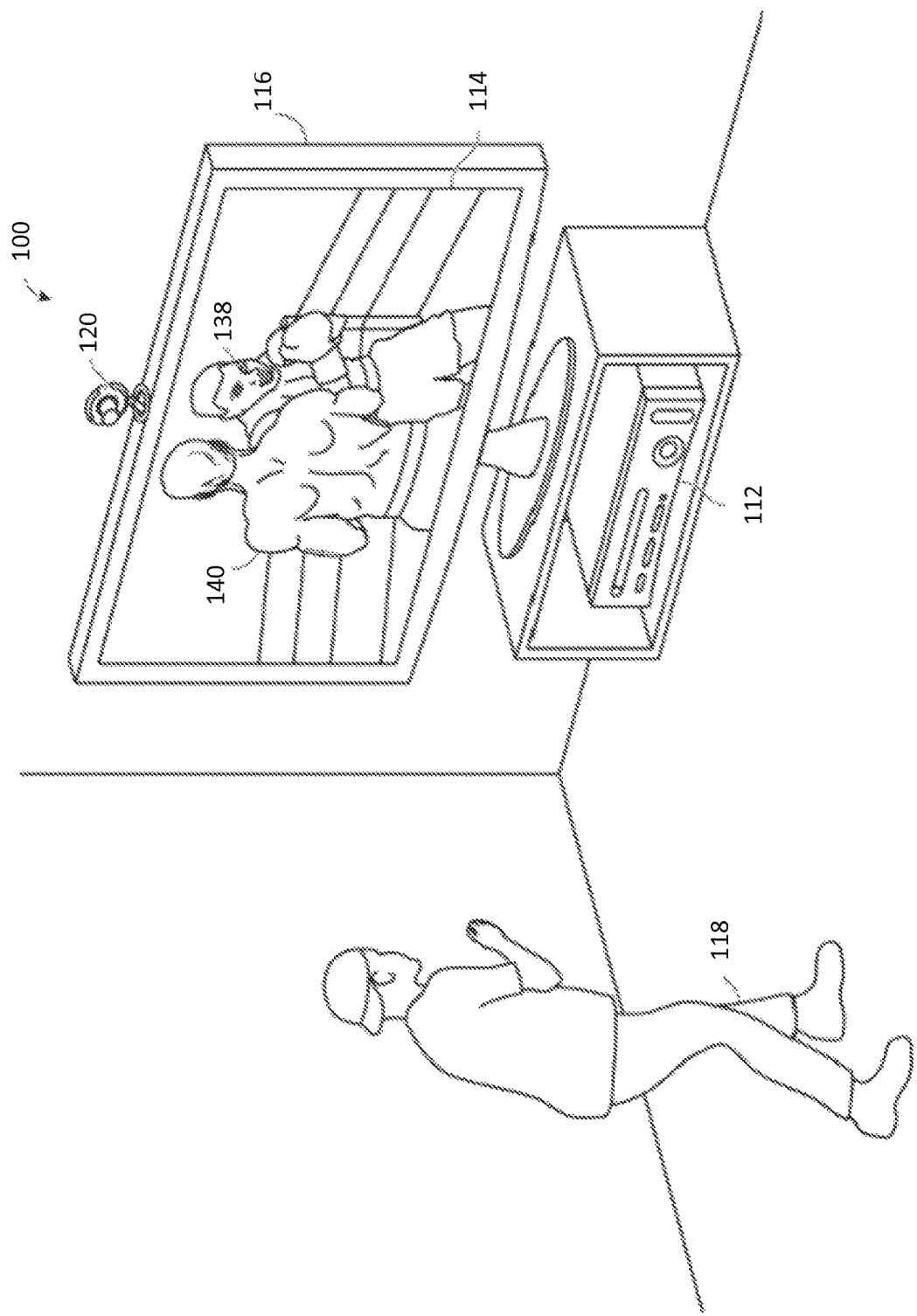
FIGS. 1A and 1B illustrate an example of a tracking system with a user playing a boxing video game.
Figure 1B:
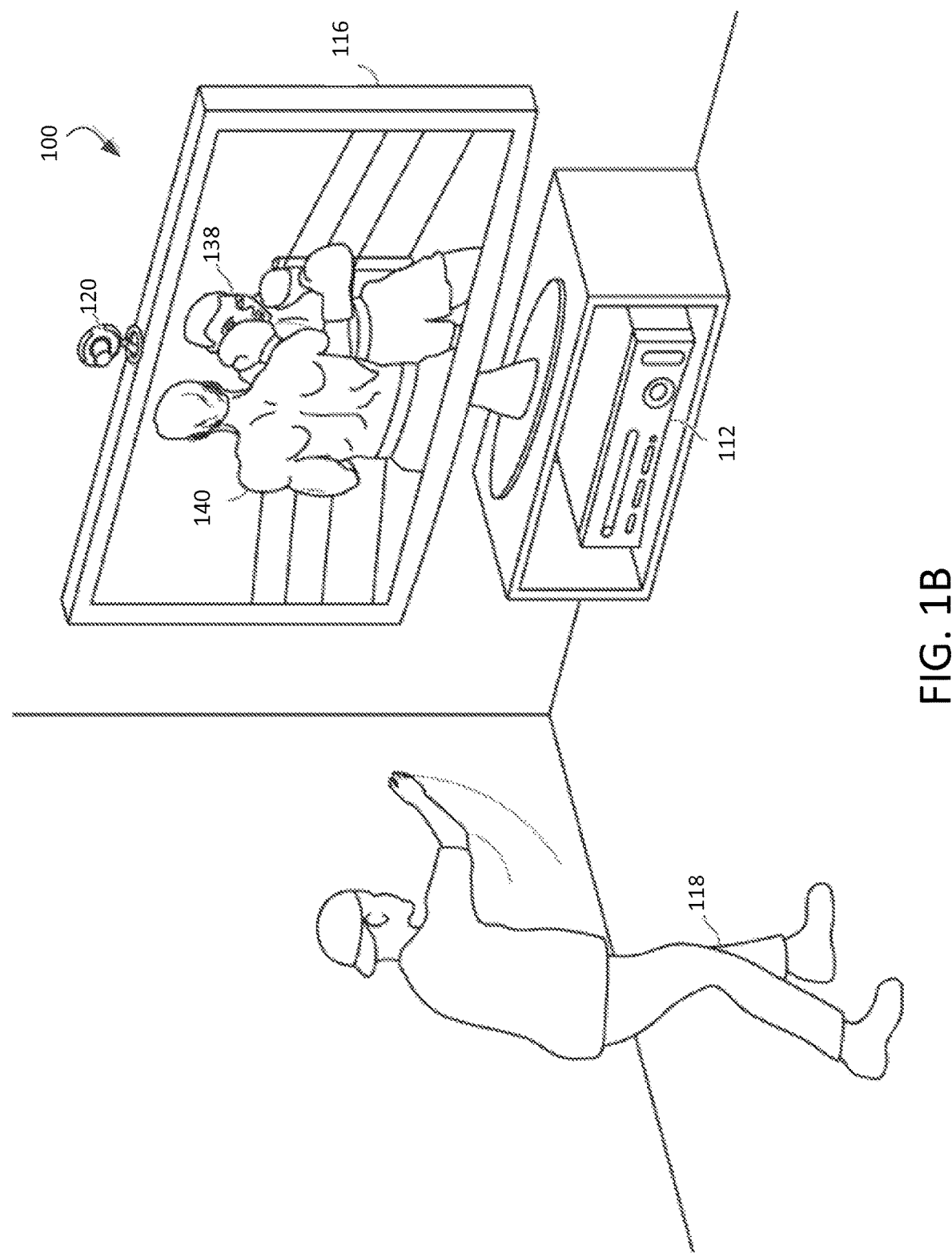

FIGS. 1A and 1B illustrate an example of a tracking system 100 with a user 118 playing a boxing video game. In an example, the tracking system 100 may be used to recognize, analyze, and/or track a human target such as the user 118 or other objects within range of the tracking system 100. As shown in FIG. 1A, the tracking system 100 includes a computing system 112 and a capture device 120. As will be describe in additional detail below, the capture device 120 may be used to obtain depth images and color images (also known as Red/Green/Blue (RGB) images) that may be used by the computing system 112 to identify one or more users or other objects, as well as to track motion and/or other user behaviors. The tracked motion and/or other user behavior may be used to update an application. Therefore, a user may manipulate game characters or other aspects of the application by using movement of the user's body and/or objects around the user, rather than (or in addition to) using controllers, remotes, keyboards, mice, or the like. For example, a video game system may update the position of images displayed in a video game based on the new positions of the objects or update an avatar based on motion of the user.

The computing system 112 may be a computer, a gaming system or console, or the like. According to an example, the computing system 112 may include hardware components and/or software components such that computing system 112 may be used to execute applications such as gaming applications, non-gaming applications, or the like. In one example, computing system 112 may include a processor such as a standardized processor, a specialized processor, a microprocessor, or the like that may execute instructions stored on a processor readable storage device for performing the processes described herein.

The capture device 120 may be, for example, a camera that may be used to visually monitor one or more users, such as the user 118, such that gestures and/or movements performed by the one or more users may be captured, analyzed, and tracked to perform one or more controls or actions within the application and/or animate an avatar or on-screen character, as will be described in more detail below.

According to one example, the tracking system 100 may be connected to an audiovisual device 116 such as a television, a monitor, a high-definition television (HDTV), or the like that may provide game or application visuals and/or audio to a user such as the user 118. For example, the computing system 112 may include a video adapter such as a graphics card and/or an audio adapter such as a sound card that may provide audiovisual signals associated with the game application, non-game application, or the like. The audiovisual device 116 may receive the audiovisual signals from the computing system 112 and may then output the game or application visuals and/or audio associated with the audiovisual signals to the user 118. According to one example, the audiovisual device 16 may be connected to the computing system 112 via, for example, an S-Video cable, a coaxial cable, a High-Definition Multimedia Interface (HDMI)cable, a Digital Video Interface (DVI) cable, a Video Graphics Array (VGA) cable, component video cable, or the like.

As shown in FIGS. 1A and 1B, the tracking system 100 may be used to recognize, analyze, and/or track a human target such as the user 118. For example, the user 118 may be tracked using the capture device 120 such that the gestures and/or movements of user 118 may be captured to animate an avatar or on-screen character and/or may be interpreted as controls that may be used to affect the application being executed by computing system 112. Thus, according to one example, the user 118 may move his or her body to control the application and/or animate the avatar or on-screen character.

In the example depicted in FIGS. 1A and 1B, the application executing on the computing system 112 may be a boxing game that the user 118 is playing. For example, the computing system 112 may use the audiovisual device 116 to provide a visual representation of a boxing opponent 138 to the user 118. The computing system 112 may also use the audiovisual device 116 to provide a visual representation of a player avatar 140 that the user 118 may control with his or her movements. For example, as shown in FIG. 1B, the user 118 may throw a punch in physical space to cause the player avatar 140 to throw a punch in game space. Thus, according to an example, the computer system 112 and the capture device 120 recognize and analyze the punch of the user 118 in physical space such that the punch may be interpreted as a game control of the player avatar 140 in game space and/or the motion of the punch may be used to animate the player avatar 140 in game space.

Other movements by the user 118 may also be interpreted as other controls or actions and/or used to animate the player avatar, such as controls to bob, weave, shuffle, block, jab, or throw a variety of different power punches. Furthermore, some movements may be interpreted as controls that may correspond to actions other than controlling the player avatar 140. For example, in one example, the player may use movements to end, pause, or save a game, select a level, view high scores, communicate with a friend, etc. According to another example, the player may use movements to select the game or other application from a main user interface. Thus, in example, a full range of motion of the user 118 may be available, used, and analyzed in any suitable manner to interact with an application.

In example, the human target such as the user 118 may have an object. In such example examples, the user of an electronic game may be holding the object such that the motions of the player and the object may be used to adjust and/or control parameters of the game. For example, the motion of a player holding a racket may be tracked and utilized for controlling an on-screen racket in an electronic sports game. In another example, the motion of a player holding an object may be tracked and utilized for controlling an on-screen weapon in an electronic combat game. Objects not held by the user may also be tracked, such as objects thrown, pushed or rolled by the user (or a different user) as well as self-propelled objects. In addition to boxing, other games may also be implemented.

According to other examples, the tracking system 100 may further be used to interpret target movements as operating system and/or application controls that are outside the realm of games. For example, virtually any controllable aspect of an operating system and/or application may be controlled by movements of the target such as the user 118.

Figure 2A:
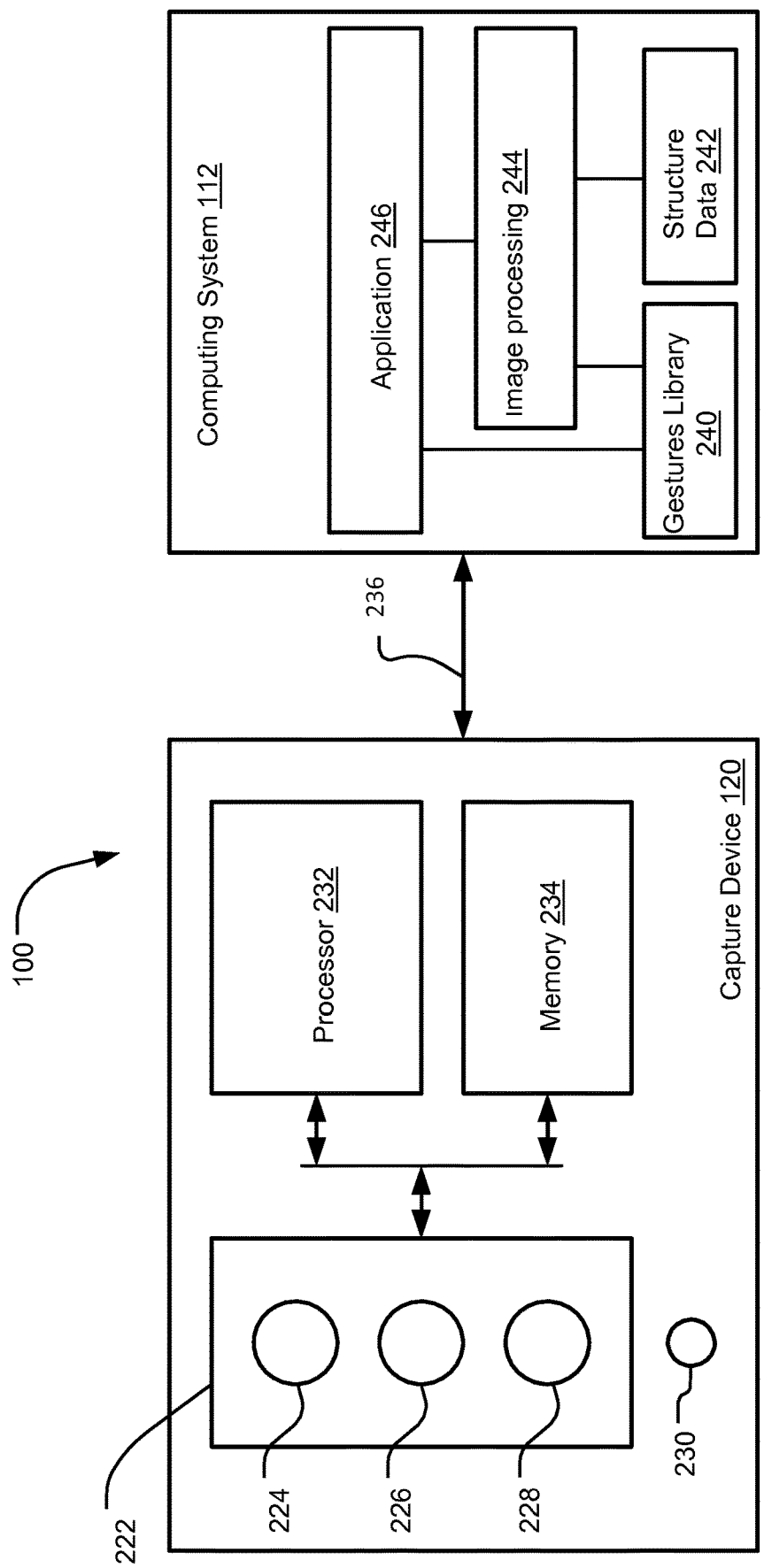
FIG. 2A illustrates an example of the capture device that may be used in the tracking system.

FIG. 2A illustrates an example of the capture device 120 that may be used in the tracking system 100. According to an example, the capture device 120 may be configured to capture video with depth information including a depth image that may include depth values via any suitable technique including, for example, time-of-flight, structured light, stereo image, or the like. According to one example, the capture device 120 may organize the depth information into "Z layers," or layers that may be perpendicular to a Z axis extending from the depth camera along its line of sight.

As shown in FIG. 2A, the capture device 120 may include an image camera component 222. According to an example, the image camera component 222 may be a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

As shown in FIG. 2A, according to an example, the image camera component 222 may include an infra-red (IR) light component 224, a three-dimensional (3-D) camera 226, and an RGB camera 228 that may be used to capture the depth image of a scene. For example, in time-of-flight analysis, the IR light component 224 of the capture device 120 may emit an infrared light onto the scene and may then use sensors (not shown) to detect the backscattered light from the surface of one or more targets and objects in the scene using, for example, the 3-D camera 226 and/or the RGB camera 228. In some examples, pulsed infrared light may be used such that the time between an outgoing light pulse and a corresponding incoming light pulse may be measured and used to determine a physical distance from the capture device 120 to a particular location on the targets or objects in the scene. Additionally, in other examples, the phase of the outgoing light wave may be compared to the phase of the incoming light wave to determine a phase shift. The phase shift may then be used to determine a physical distance from the capture device to a particular location on the targets or objects.

According to another example, time-of-flight analysis may be used to indirectly determine a physical distance from the capture device 120 to a particular location on the targets or objects by analyzing the intensity of the reflected beam of light over time via various techniques including, for example, shuttered light pulse imaging.

In another example, the capture device 120 may use a structured light to capture depth information. In such an analysis, patterned light (i.e., light displayed as a known pattern such as grid pattern, a stripe pattern, or different pattern) may be projected onto the scene via, for example, the IR light component 224. Upon striking the surface of one or more targets or objects in the scene, the pattern may become deformed in response. Such a deformation of the pattern may be captured by, for example, the 3-D camera 226 and/or the RGB camera 28 and may then be analyzed to determine a physical distance from the capture device to a particular location on the targets or objects. In some implementations, the IR Light component 224 is displaced from the cameras 226 and 228 so triangulation may be used to determined distance from cameras 226 and 228. In some implementations, the capture device 120 will include a dedicated IR sensor to sense the IR light.

According to another example, the capture device 120 may include two or more physically separated cameras that may view a scene from different angles to obtain visual stereo data that may be resolved to generate depth information. Other types of depth image sensors may also be used to create a depth image.

The capture device 120 may further include a microphone 130. The microphone 130 may include a transducer or sensor that may receive and convert sound into an electrical signal. According to one example, the microphone 130 may be used to reduce feedback between the capture device 120 and the computing system 112 in the target recognition, analysis, and tracking system 100. Additionally, the microphone 30 may be used to receive audio signals (e.g., voice commands) that may also be provided by the user to control applications such as game applications, non-game applications, or the like that may be executed by the computing system 112.

In an example, the capture device 120 may further include a processor 232 that may be in operative communication with the image camera component 222. The processor 232 may include a standardized processor, a specialized processor, a microprocessor, or the like that may execute instructions including, for example, instructions for receiving a depth image, generating the appropriate data format (e.g., frame) and transmitting the data to computing system 112.

The capture device 120 may further include a memory component 234 that may store the instructions that may be executed by the processor 232, images or frames of images captured by the 3-D camera and/or RGB camera, or any other suitable information, images, or the like. According to an example, the memory component 234 may include random access memory (RAM), read only memory (ROM), cache, Flash memory, a hard disk, or any other suitable storage component. As shown in FIG. 2A, in one example, the memory component 234 may be a separate component in communication with the image capture component 222 and the processor 232. According to another example, the memory component 234 may be integrated into the processor 232 and/or the image capture component 222.

The memory component 234 may comprise a storage medium having a concrete, tangible, physical structure. As is known, a signal does not have a concrete, tangible, physical structure. Memory, as well as any computer-readable storage medium described herein, is not to be construed as a signal. The memory, as well as any computer-readable storage medium described herein, is not to be construed as a transient signal. The memory, as well as any computer-readable storage medium described herein, is not to be construed as a propagating signal. The memory, as well as any computer-readable storage medium described herein, is to be construed as an article of manufacture.

As shown in FIG. 2A, the capture device 120 may be in communication with the computing system 212 via a communication link 236. The communication link 236 may be a wired connection including, for example, a USB connection, a Firewire connection, an Ethernet cable connection, or the like and/or a wireless connection such as a wireless 802.11b, g, a, or n connection. According to one example, the computing system 112 may provide a clock to the capture device 120 that may be used to determine when to capture, for example, a scene via the communication link 236. Additionally, the capture device 120 provides the depth images and color images captured by, for example, the 3-D camera 226 and/or the RGB camera 228 to the computing system 112 via the communication link 236. In one example, the depth images and color images are transmitted at 30 frames per second. The computing system 112 may then use the model, depth information, and captured images to, for example, control an application such as a game or word processor and/or animate an avatar or on-screen character.

Computing system 112 includes gestures library 240, structure data 242, depth image processing and object reporting module 244 and application 246. Depth image processing and object reporting module 244 uses the depth images to track motion of objects, such as the user and other objects. To assist in the tracking of the objects, depth image processing and object reporting module 244 uses gestures library 240 and structure data 242.

Structure data 242 includes structural information about objects that may be tracked. For example, a skeletal model of a human may be stored to help understand movements of the user and recognize body parts. Structural information about inanimate objects may also be stored to help recognize those objects and help understand movement.

Gestures library 240 may include a collection of gesture filters, each comprising information concerning a gesture that may be performed by the skeletal model (as the user moves). The data captured by the cameras 226, 228 and the capture device 120 in the form of the skeletal model and movements associated with it may be compared to the gesture filters in the gesture library 240 to identify when a user (as represented by the skeletal model) has performed one or more gestures. Those gestures may be associated with various controls of an application. Thus, the computing system 112 may use the gestures library 240 to interpret movements of the skeletal model and to control application 246 based on the movements. As such, gestures library may be used by depth image processing and object reporting module 244 and application 246.

Application 246 can be a video game, productivity application, etc. In one example, depth image processing and object reporting module 244 will report to application 246 an identification of each object detected and the location of the object for each frame. Application 246 will use that information to update the position or movement of an avatar or other images in the display.

Figure 2B:
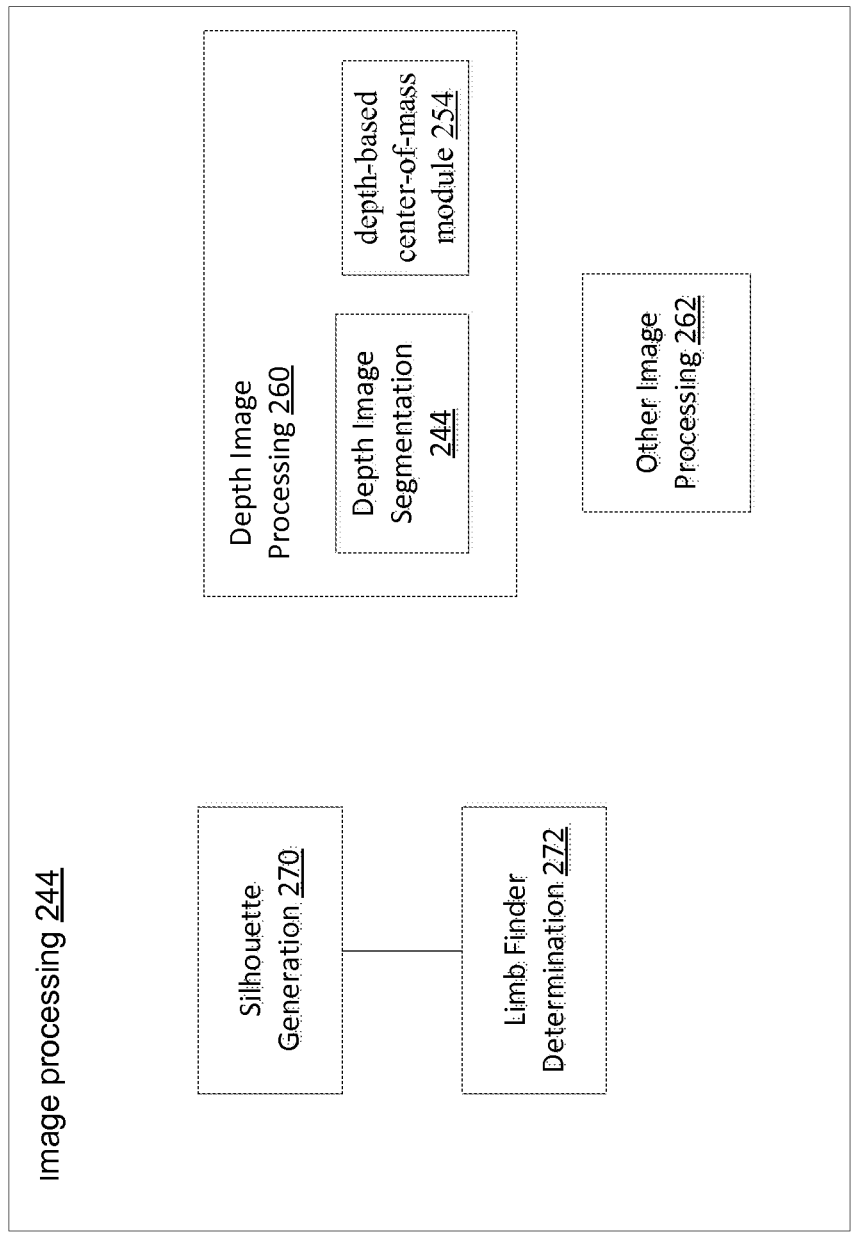
FIG. 2B illustrates an example of the image processing module introduced in FIG. 2A.

FIG. 2B illustrates an example of the image processing module 244 introduced in FIG. 2A. Referring to FIG. 2B, the image processing module 244 is shown as including Silhouette Generation module 270, Limb finder determination module 270, Depth image processing module 260 including depth image segmentation module 244 and other image processing module 262.

Silhouette generation 270 may be used to create a silhouette of a user. The silhouette may be the pixels corresponding to a user. In one example, the silhouette may be generated by depth image segmentation module 252.

In an example, the depth image segmentation module 252 is configured to detect one or more users (e.g., human targets) within a depth image, and associates a segmentation value with each pixel. Such segmentation values are used to indicate which pixels correspond to a user. For example, a segmentation value of 1 may be assigned to all pixels that correspond to a first user, a segmentation value of 2 may be assigned to all pixels that correspond to a second user, and an arbitrary predetermined value (e.g., 255) may be assigned to the pixels that do not correspond to a user. It is also possible that segmentation values may be assigned to objects, other than users, that are identified within a depth image, such as, but not limited to, a tennis racket, a jump rope, a ball, a floor, or the like. In an example, as a result of a segmentation process performed by the depth image segmentation module 252, each pixel in a depth image will have four values associated with the pixel, including: an x-position value (i.e., a horizontal value); a y-position value (i.e., a vertical value); a z-position value (i.e., a depth value); and a segmentation value, which was just explained above. In other words, after segmentation, a depth image may specify that a plurality of pixels correspond to a user, wherein such pixels may also be referred to as a depth-based silhouette of a user. Additionally, the depth image may specify, for each of the pixels corresponding to the user, a pixel location and a pixel depth. The pixel location may be indicated by an x-position value (i.e., a horizontal value) and a y-position value (i.e., a vertical value). The pixel depth may be indicated by a z-position value (also referred to as a depth value), which is indicative of a distance between the capture device (e.g., 120) used to obtain the depth image and the portion of the user represented by the pixel.

Pixels of an image with a specific segmentation value may thus define a silhouette. In one example, a depth buffer stores segmentation values along with depth image values. Other ways of obtaining a silhouette may also be used.

Figure 5:
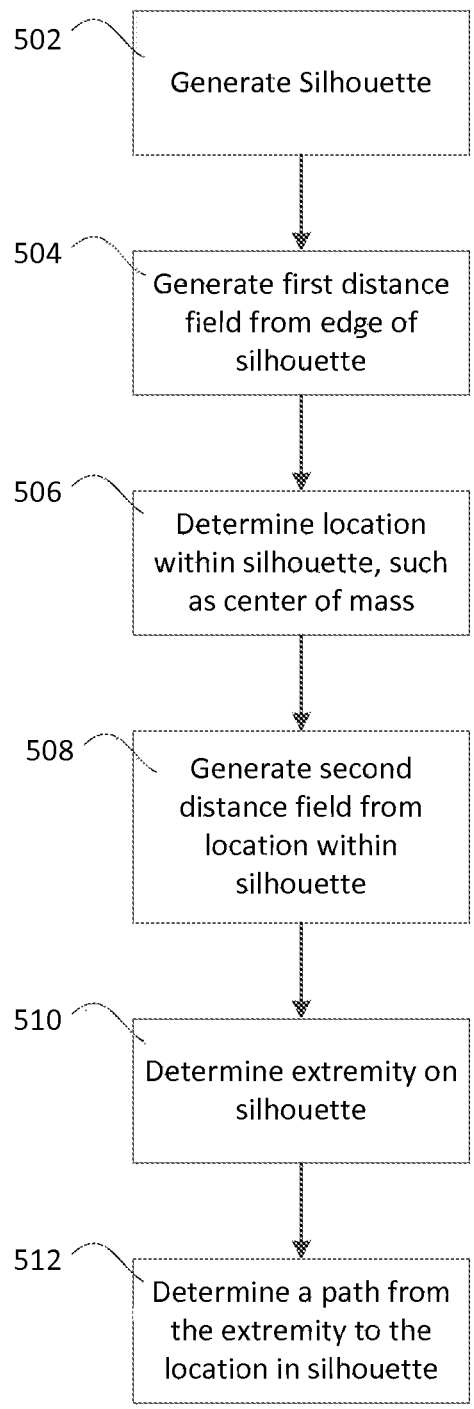
FIG. 5 is a flow chart that illustrates an example process for silhouette based limb detection.
Figure 7:
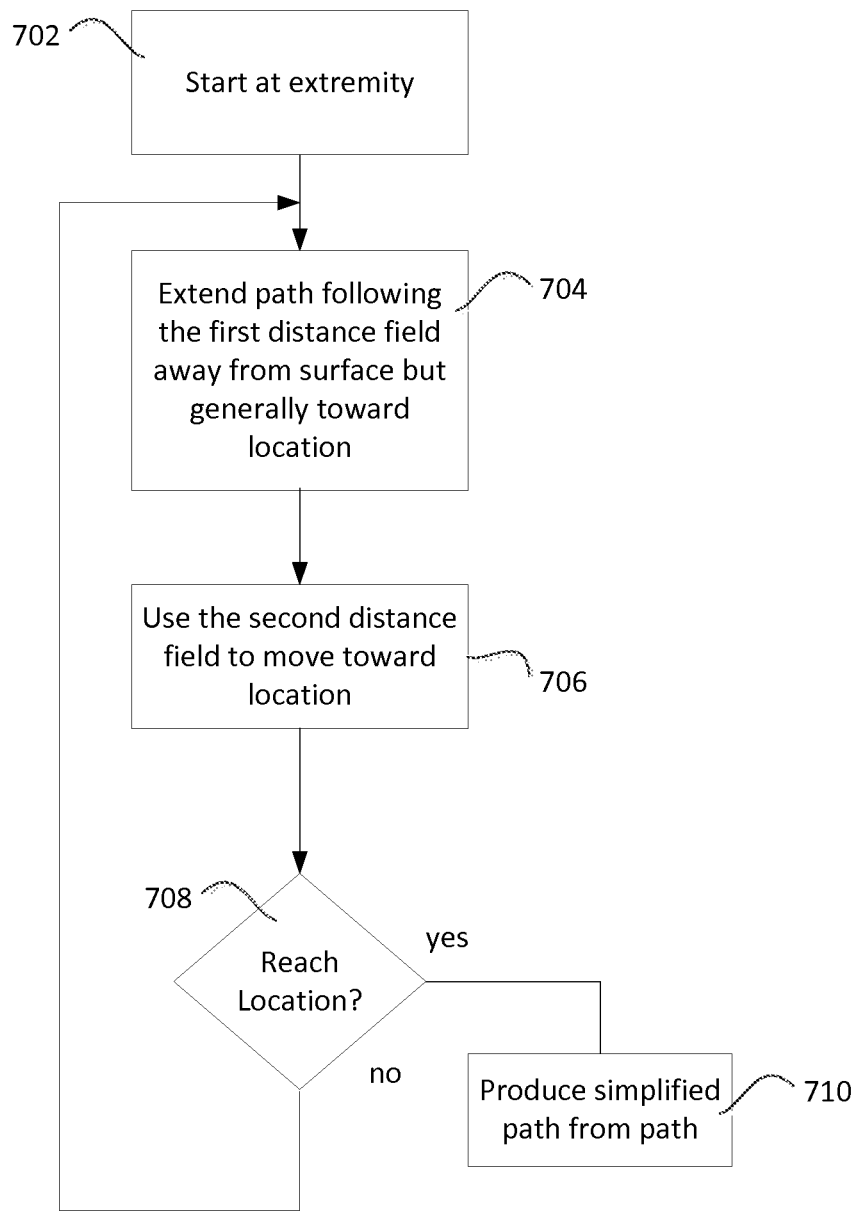
FIG. 7 is a flow chart of an exemplary method using first and second distance fields to determine a path from an extremity to a location in the silhouette.

The limb finder module determination module 272 may use the generated silhouette to determine limbs based on generated distance fields as described with respect to FIGS. 5 and 7. The result of the limb finder module determination module 272 may be used to provide input to the application, by itself or in combination with other image processing 262.

Still referring to FIG. 2B, in an example, a depth-based center-of-mass module 254 may be used to determine a depth-based center-of-mass position for the plurality of pixels corresponding to a user that accounts for distances between the portions of the user represented by the pixels and the capture device used to obtain the depth image. This center of mass position may be used as the location to construct the second distance field as described below with respect to FIG. 7.

Figure 3:
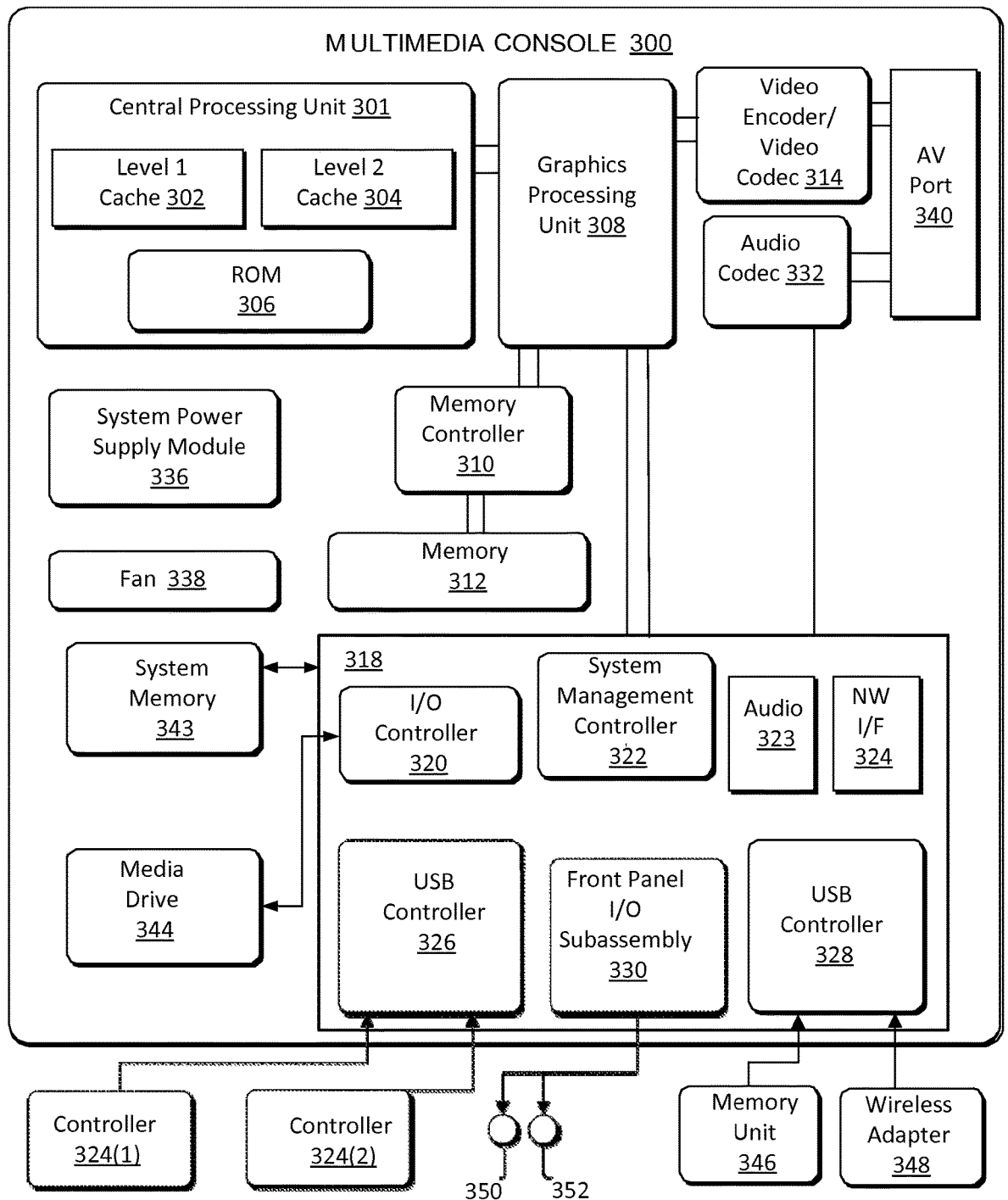
FIG. 3 illustrates an example of a computing system that may be the computing system shown in FIGS. 1A-2B used to track motion and/or animate (or otherwise update) an avatar or other on-screen object displayed by an application.

FIG. 3 illustrates an example of a computing system that may be the computing system 112 shown in FIGS. 1A-2B used to track motion and/or animate (or otherwise update) an avatar or other on-screen object displayed by an application. The computing system such as the computing system 112 described above with respect to FIGS. 1A-2 may be a multimedia console, such as a gaming console. As shown in FIG. 3, the multimedia console 300 has a central processing unit (CPU) 301 having a level 1 cache 102, a level 2 cache 304, and a flash ROM (Read Only Memory) 306. The level 1 cache 302 and a level 2 cache 304 temporarily store data and hence reduce the number of memory access cycles, thereby improving processing speed and throughput. The CPU 301 may be provided having more than one core, and thus, additional level 1 and level 2 caches 302 and 304. The flash ROM 306 may store executable code that is loaded during an initial phase of a boot process when the multimedia console 300 is powered ON.

A graphics processing unit (GPU) 308 and a video encoder/video codec (coder/decoder) 314 form a video processing pipeline for high speed and high resolution graphics processing. Data is carried from the graphics processing unit 308 to the video encoder/video codec 314 via a bus. The video processing pipeline outputs data to an A/V (audio/video) port 340 for transmission to a television or other display. A memory controller 310 is connected to the GPU 308 to facilitate processor access to various types of memory 312, such as, but not limited to, a RAM (Random Access Memory).

The multimedia console 300 includes an I/O controller 320, a system management controller 322, an audio processing unit 323, a network interface 324, a first USB host controller 326, a second USB controller 328 and a front panel I/O subassembly 330 that are preferably implemented on a module 318. The USB controllers 326 and 328 serve as hosts for peripheral controllers 342(1)-342(2), a wireless adapter 348, and an external memory device 346 (e.g., flash memory, external CD/DVD ROM drive, removable media, etc.). The network interface 324 and/or wireless adapter 348 provide access to a network (e.g., the Internet, home network, etc.) and may be any of a wide variety of various wired or wireless adapter components including an Ethernet card, a modem, a Bluetooth module, a cable modem, and the like.

System memory 343 is provided to store application data that is loaded during the boot process. A media drive 344 is provided and may comprise a DVD/CD drive, Blu-Ray drive, hard disk drive, or other removable media drive, etc. The media drive 344 may be internal or external to the multimedia console 300. Application data may be accessed via the media drive 344 for execution, playback, etc. by the multimedia console 300. The media drive 344 is connected to the I/O controller 320 via a bus, such as a Serial ATA bus or other high speed connection (e.g., IEEE 1394).

The memory 312, 343 and 346 may comprise a storage medium having a concrete, tangible, physical structure. As is known, a signal does not have a concrete, tangible, physical structure. Memory, as well as any computer-readable storage medium described herein, is not to be construed as a signal. The memory, as well as any computer-readable storage medium described herein, is not to be construed as a transient signal. The memory, as well as any computer-readable storage medium described herein, is not to be construed as a propagating signal. The memory, as well as any computer-readable storage medium described herein, is to be construed as an article of manufacture.

The system management controller 322 provides a variety of service functions related to assuring availability of the multimedia console 300. The audio processing unit 323 and an audio codec 332 form a corresponding audio processing pipeline with high fidelity and stereo processing. Audio data is carried between the audio processing unit 323 and the audio codec 332 via a communication link. The audio processing pipeline outputs data to the A/V port 340 for reproduction by an external audio player or device having audio capabilities.

The front panel I/O subassembly 330 supports the functionality of the power button 350 and the eject button 352, as well as any LEDs (light emitting diodes) or other indicators exposed on the outer surface of the multimedia console 300. A system power supply module 336 provides power to the components of the multimedia console 300. A fan 338 cools the circuitry within the multimedia console 300.

The CPU 301, GPU 308, memory controller 310, and various other components within the multimedia console 300 are interconnected via one or more buses, including serial and parallel buses, a memory bus, a peripheral bus, and a processor or local bus using any of a variety of bus architectures. By way of example, such architectures ma y include a Peripheral Component Interconnects (PCI) bus, PCI-Express bus, etc.

When the multimedia console 300 is powered ON, application data may be loaded from the system memory 343 into memory 312 and/or caches 302, 304 and executed on the CPU 301. The application may present a graphical user interface that provides a consistent user experience when navigating to different media types available on the multimedia console 300. In operation, applications and/or other media contained within the media drive 344 may be launched or played from the media drive 344 to provide additional functionalities to the multimedia console 300.

The multimedia console 300 may be operated as a standalone system by simply connecting the system to a television or other display. In this standalone mode, the multimedia console 300 allows one or more users to interact with the system, watch movies, or listen to music. However, with the integration of broadband connectivity made available through the network interface 324 or the wireless adapter 348, the multimedia console 300 may further be operated as a participant in a larger network community.

When the multimedia console 300 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 Kbps), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 300 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 301 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 342(1) and 342(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 226, 228 and capture device 120 may define additional input devices for the console 300 via USB controller 326 or other interface.

Figure 4:
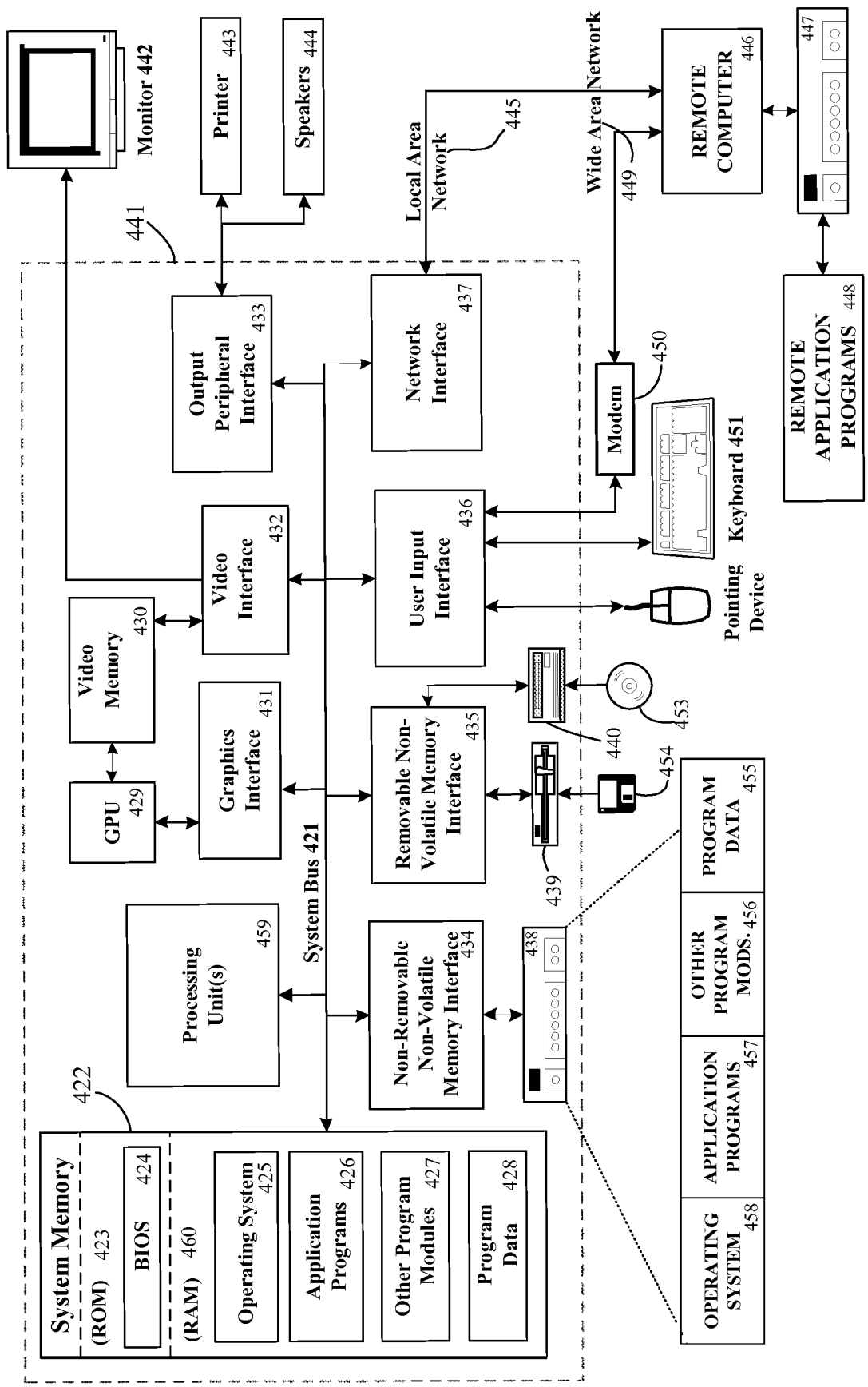
FIG. 4 illustrates another example of a computing system that may be the computing system shown in FIGS. 1A-2B used to track motion and/or animate (or otherwise update) an avatar or other on-screen object displayed by an application.

FIG. 4 illustrates another example of a computing system 420 that may be the computing system 112 shown in FIGS. 1A-2B used to track motion and/or animate (or otherwise update) an avatar or other on-screen object displayed by an application. The computing system 420 is only one example of a suitable computing system and is not intended to suggest any limitation as to the scope of use or functionality of the presently disclosed subject matter. Neither should the computing system 420 be interpreted as having any dependency or requirement relating to any one or combination of components illustrated in the exemplary computing system 420. In some examples the various depicted computing elements may include circuitry configured to instantiate specific aspects of the present disclosure. For example, the term circuitry used in the disclosure may include specialized hardware components configured to perform function(s) by firmware or switches. In other examples the term circuitry may include a general purpose processing unit, memory, etc., configured by software instructions that embody logic operable to perform function(s). In example examples where circuitry includes a combination of hardware and software, an implementer may write source code embodying logic and the source code may be compiled into machine readable code that may be processed by the general purpose processing unit. Since one skilled in the art may appreciate that the state of the art has evolved to a point where there is little difference between hardware, software, or a combination of hardware/software, the selection of hardware versus software to effectuate specific functions is a design choice left to an implementer. More specifically, one of skill in the art may appreciate that a software process may be transformed into an equivalent hardware structure, and a hardware structure may itself be transformed into an equivalent software process. Thus, the selection of a hardware implementation versus a software implementation is one of design choice and left to the implementer.

Computing system 420 comprises a computer 441, which typically includes a variety of computer readable media. Computer readable media may be any available media that may be accessed by computer 441 and includes both volatile and nonvolatile media, removable and non-removable media. The system memory 422 includes computer storage media in the form of volatile and/or nonvolatile memory such as read only memory (ROM) 423 and random access memory (RAM) 460.

The memory 434, 435, 422 and 447 may comprise a storage medium having a concrete, tangible, physical structure. As is known, a signal does not have a concrete, tangible, physical structure. Memory, as well as any computer-readable storage medium described herein, is not to be construed as a signal. The memory, as well as any computer-readable storage medium described herein, is not to be construed as a transient signal. The memory, as well as any computer-readable storage medium described herein, is not to be construed as a propagating signal. The memory, as well as any computer-readable storage medium described herein, is to be construed as an article of manufacture.

A basic input/output system 424 (BIOS), containing the basic routines that help to transfer information between elements within computer 441, such as during start-up, is typically stored in ROM 423. RAM 460 typically contains data and/or program modules that are immediately accessible to and/or presently being operated on by processing unit 459. By way of example, and not limitation, FIG. 4 illustrates operating system 425, application programs 426, other program modules 427, and program data 428.

The computer 441 may also include other removable/non-removable, volatile/nonvolatile computer storage media. By way of example only, FIG. 4 illustrates a hard disk drive 438 that reads from or writes to non-removable, nonvolatile magnetic media, a magnetic disk drive 439 that reads from or writes to a removable, nonvolatile magnetic disk 454, and an optical disk drive 440 that reads from or writes to a removable, nonvolatile optical disk 453 such as a CD ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 438 is typically connected to the system bus 421 through an non-removable memory interface such as interface 434, and magnetic disk drive 439 and optical disk drive 440 are typically connected to the system bus 421 by a removable memory interface, such as interface 435.

The drives and their associated computer storage media discussed above and illustrated in FIG. 4, provide storage of computer readable instructions, data structures, program modules and other data for the computer 441. In FIG. 4, for example, hard disk drive 438 is illustrated as storing operating system 458, application programs 457, other program modules 456, and program data 455. Note that these components may either be the same as or different from operating system 425, application programs 426, other program modules 427, and program data 428. Operating system 458, application programs 457, other program modules 456, and program data 455 are given different numbers here to illustrate that, at a minimum, they are different copies. A user may enter commands and information into the computer 441 through input devices such as a keyboard 451 and pointing device 452, commonly referred to as a mouse, trackball or touch pad. Other input devices (not shown) may include a microphone, joystick, game pad, satellite dish, scanner, or the like. These and other input devices are often connected to the processing unit 459 through a user input interface 436 that is coupled to the system bus, but may be connected by other interface and bus structures, such as a parallel port, game port or a universal serial bus (USB). The cameras 226, 228 and capture device 120 may define additional input devices for the computing system 420 that connect via user input interface 436. A monitor 442 or other type of display device is also connected to the system bus 421 via an interface, such as a video interface 432. In addition to the monitor, computers may also include other peripheral output devices such as speakers 444 and printer 443, which may be connected through a output peripheral interface 433. Capture Device 120 may connect to computing system 420 via output peripheral interface 433, network interface 437, or other interface.

The computer 441 may operate in a networked environment using logical connections to one or more remote computers, such as a remote computer 446. The remote computer 446 may be a personal computer, a server, a router, a network PC, a peer device or other common network node, and typically includes many or all of the elements described above relative to the computer 441, although only a memory storage device 447 has been illustrated in FIG. 4. The logical connections depicted include a local area network (LAN) 445 and a wide area network (WAN) 449, but may also include other networks. Such networking environments are commonplace in offices, enterprise-wide computer networks, intranets and the Internet.

When used in a LAN networking environment, the computer 441 is connected to the LAN 445 through a network interface 437. When used in a WAN networking environment, the computer 441 typically includes a modem 450 or other means for establishing communications over the WAN 449, such as the Internet. The modem 450, which may be internal or external, may be connected to the system bus 421 via the user input interface 436, or other appropriate mechanism. In a networked environment, program modules depicted relative to the computer 441, or portions thereof, may be stored in the remote memory storage device. By way of example, and not limitation, FIG. 4 illustrates application programs 448 as residing on memory device 447. It will be appreciated that the network connections shown are exemplary and other means of establishing a communications link between the computers may be used.

As explained above, the capture device 120 provides RGB images (also known as color images) and depth images to the computing system 112. The depth image may be a plurality of observed pixels where each observed pixel has an observed depth value. For example, the depth image may include a two-dimensional (2-D) pixel area of the captured scene where each pixel in the 2-D pixel area may have a depth value such as a length or distance in, for example, centimeters, millimeters, or the like of an object in the captured scene from the capture device.

As mentioned above, skeletal tracking (ST) techniques are often used to detect motion of a user or other user behaviors. However, while useful for detecting certain types of user behaviors, ST techniques have proven to be unreliable for detecting other types of user behavior. For example, ST techniques are typically unreliable for detecting user behaviors where the user is laying or sitting on or near the floor. Certain examples described herein rely on depth images to detect user behaviors. Such user behaviors detected based on depth base images may be used in place of, or to supplement, ST techniques for detecting user behaviors. Accordingly, before discussing such examples in additional detail, it would first be useful to provide additional details of depth images.

FIG. 5 is a flow chart that illustrates a silhouette based limb detection of one example. A silhouette-based limb finder may be used to detect limbs from a camera image.

This limb detection may be used to control an application, such as a game, alone or in combination with other image processing such as skeletal tracking methods.

In step 502, a silhouette is generated. The silhouette may be a portion of the camera image associated with an object such as a person in the camera image. In one example, the silhouette may be obtained from the output of a segmentation process that identifies objects in the camera image. For example, a silhouette may be obtained from depth image segmentation module 244 of FIG. 2B. Silhouette generation and segmentation does not need to use a depth camera image. Silhouettes may be generated from other types of images, for example. However, in one example, the system produces segmentation values for pixels that are stored in a depth buffer.

FIG. 6A illustrates a simplified example of a silhouette. In this example, pixels inside the silhouette are given a value of "1" and pixels outside the silhouette are given a value of "-".

Looking again at FIG. 5, in step 504, the first distance field may be generated based on the silhouette that indicates the distance from the edge of the silhouette.

FIG. 6B illustrates a simplified example of a first distance field showing distance from an edge for the simplified silhouette shown in FIG. 6A. In this simplified example, pixels at the edge of the silhouette may have a value of "1", pixels just inside those pixels may have a value of "2" and so on. As discussed below, the first distance field may be used to identify a mid-line on any determined limbs.

In step 506, a location in a silhouette, such as a center of mass, is determined. The center of mass may be obtained using depth based center-of-mass module 254 of FIG. 2B. The depth-based center-of-mass estimates the center of mass using depth camera data. Alternately, another central location may be estimated by using the silhouette. This may be the center of the silhouette or the center of a central portion of the silhouette. In another example, the first distance field may be used to determine a location. For example, the first distance field may be used to determine a central portion of the silhouette which is a certain distance from the edge.

In step 508, a second distance field is generated from the location within the silhouette. FIG. 6C illustrates a simplified example of a second distance field showing distance from a location (identified by the "*" value) for the simplified silhouette shown in FIG. 6A. Pixels adjacent to the location may be given a value of "one", pixels adjacent to those pixels may be given a value of "two" and so on. Thus each pixel value in the second distance field indicates the distance from the location (identified by the "*" value in the example of FIG. 6C). In one example, the pixel values in the second distance field indicate distances within the silhouette. That is, the pixel values indicate a distance of a path from the pixel to the location without leaving the silhouette.

In step 510, an extremity on the silhouette is determined. The extremity may be identified from pixels in the second distance field that are the furthest from the location determined in step 506. These extremities may be for example further away from the location than any pixels in a region around the pixel.

In step 512, a path is determined from the extremity to the location in the silhouette. This may be done using the method of FIG. 6 described below or by an alternate method.

The steps of the method of FIG. 5 may be done in hardware or as computer readable instructions implemented using a processor. In one example, the method is done using the gaming console example described with respect to FIGS. 1-4 above. For example, the steps of the method of FIG. 5 may be done using the Limb-finder determination module 272 of FIG. 2B. Alternately, the steps of the method of FIG. 5 may be done on other devices including Personal Computers (PCs), and hand held devices, such as smart phones.

FIG. 7 is a flow chart of an exemplary method using first and second distance fields to determine a path from an extremity to a location in the silhouette. The description of the flow chart of FIG. 7 uses a theoretical example of a portion of a silhouette of a "limb" and corresponding portions of first and second distance fields as illustrated by FIGS. 8A-C. FIG. 8A illustrates an example of a portion of a silhouette showing a portion of a "limb". FIG. 8B illustrates an example of a portion of first distance field showing distance from a silhouette edge for the portion of a silhouette shown in FIG. 8A. FIG. 8C illustrates a simplified example of a portion of a second distance field showing distance from a location in a silhouette for the portion of a silhouette shown in FIG. 8A.

The first distance field may be used to keep the produced path near a mid-line of the limb. As shown in FIG. 8B, a reasonable mid-line of a "limb" will tend to be those pixels furthest from the edge of the silhouette. These pixels may be determined from the first distance field. The second distance field may be used to keep the path moving toward the location.

Looking again at FIG. 7, in step 702, the method starts at an extremity. As shown in FIG. 8C, the extremity will tend to have a larger distance from the location, such as the determined center of mass. In the example of FIG. 8C, the extremity is a pixel with the value "70" shown in bold.

In step 704, the path is extended away from the surface following the first distance field generally toward the location. For example, the path may move toward the midline of a "limb" as indicated by the first distance field. In the example of FIG. 8B, a generated path moves away from the extremity toward a midline as indicated by the bolded pixels.

In step 706, the second distance field is used to move toward the location. For example, the path moves along a mid-line of a "limb" toward the location. In the example of FIG. 8B, the highest pixel of the bolded path has a value of "5", which corresponds to the bolded value "64" in FIG. 8C. There are no pixels adjacent this highest bolded pixel that has a value of "5" or more. The second distance field may be used to select the next pixel in the path (in this case pixel with the value "62" to the upper right in FIG. 8C).

Note that without the use of the first distance field, a path generated only with the second distance field would tend to move toward an edge of the "limb". In the example of FIG. 8C, such a path would tend to hug the right hand edge of the "limb".

In step 708, it is checked if the location is reached. If so, in step 710, a simplified path may be created from the path. For example, the path may be curve fit to best match a number of lines. In one example, a simplified path of three lines is used. This simplified path may be used as a limb for tracking purposes.

The steps 704 and 706 of FIG. 7 may be repeated until the location is reached and the path is finished.

The method of FIG. 7 is only exemplary. Some other method using the first and second distance fields may be done. For example, some other function of the first and second distance fields may be used.

In one example, the adjacent pixel with the highest value in the first distance field and a lower (or equal) value in the second distance field (than the current pixel) may be selected as the next pixel in the path. If there is no such adjacent pixel, the adjacent pixel with the lowest value in the second distance field may be selected.

The steps of the method of FIG. 7 may be done in hardware or as computer readable instructions implemented using a processor. In one example, the method is done using the gaming console example described with respect to FIGS. 1-4 above. For example, the steps of the method of FIG. 7 may be done using the Limb-finder determination module 272 of FIG. 2B. Alternately, the steps of the method of FIG. 7 may be done on other devices including Personal Computers (PCs), and hand held devices, such as smart phones.

Figure 9D:
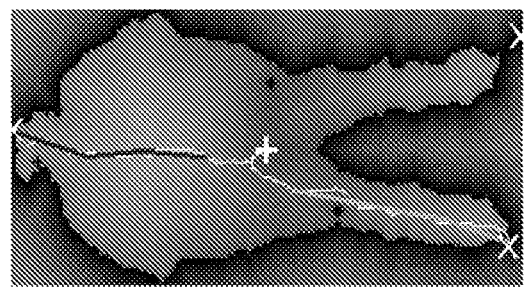
FIGS. 9A-D illustrate examples of silhouette based limb finding.
Figure 9C:
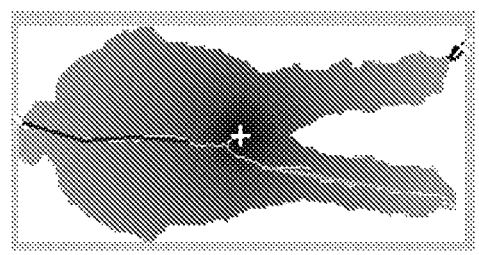
Figure 9B:
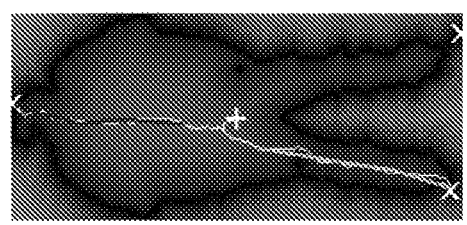
Figure 9A:
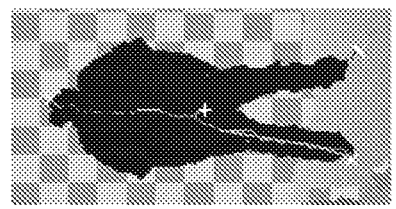
Figure 10B:
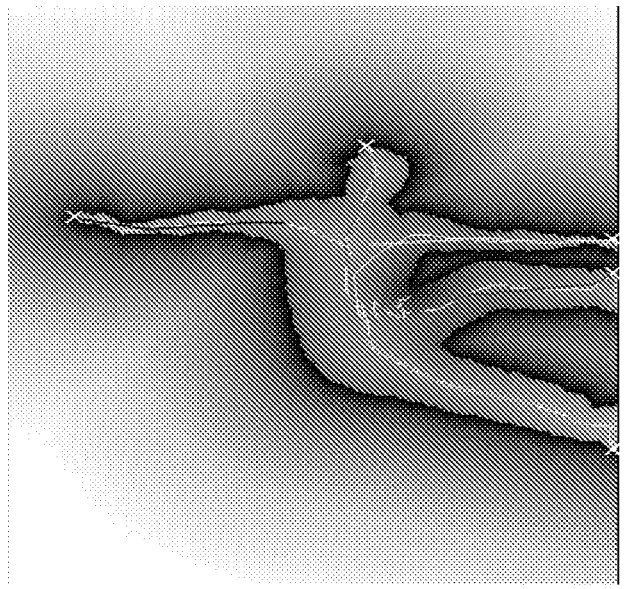
FIGS. 10A-B illustrate examples of silhouette based limb finding.
Figure 10A:
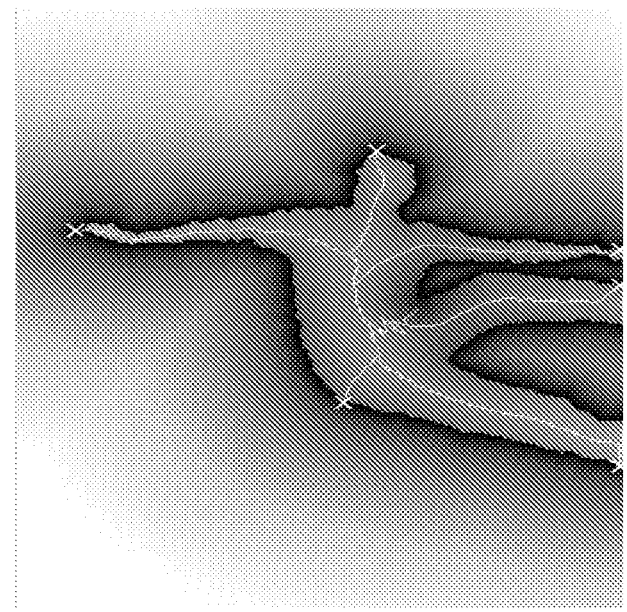

FIGS. 9A-D and 10A-B are drawings that illustrate examples of a silhouette based limb finding. FIG. 9A illustrates a silhouette. FIG. 9B illustrates a distance field from the edges of the silhouette (the brighter the image, the further from the edge). FIG. 9C illustrates a distance field from the center-of-mass of the player (the brighter the point, the further from the location, which is the "+" in the image):

FIGS. 10A-B illustrate an example with a generated path from extremity points. FIG. 10A shows paths from extremity points to the location such as the center-of-mass. Extremity points may be points farthest from the location along the second distance field, but are not too close to each other, at least in terms of pixel distance to first-common-pixel. These are represented by "X" symbols in FIGS. 8A and 8B. A path along the distance fields to the center of mass, following a "bottom of the valley, flowing towards the location" approach. FIG. 10B illustrates curve-fit segments to these paths to generate the "limbs".

In one example, a method for use by at least one processor and at least one memory is done. Computer-executable instructions may be stored in the at least one memory which may be executed by the at least one processor. The method may include generating a first distance field relative to an edge of a silhouette in an image. The method may also include generating a second distance field relative to a location within the silhouette. The method may further include generating, based on the first distance field and the second distance field, a path from an extremity point of the silhouette to the location.

The path may be generated by examining the first distance and second distance field for an appropriate next pixel. Adjacent pixels to a current pixel in the path may be examined to determine the appropriate next pixel.

A game in a game console may be controlled using the path. The extremity point of the silhouette may be determined using the second distance field. A limb in the silhouette may be determined using the path. The path may be kept near a mid-line of the determined limb using the first distance field. A center of mass value may be used as the location.

In one example, a system comprises a capture device that obtains images, one or more storage devices that store images from the capture device and one or more processors in communication with the one or more storage devices. The one or more processors are configured to determine, for at least one of the images a path from an extremity point of a silhouette in one of the images to a location in the silhouette. This determination of the path may include generating a first distance field relative to an edge of the silhouette; generating a second distance field relative to a location within the silhouette; and generating, based on the first distance field and the second distance field, a path from an extremity point of the silhouette to the location.

The one or more processors may be further configured to generate the path by examining the first distance and second distance field for an appropriate next pixel. The one or more processors may be further configured to examine adjacent pixels to determine the appropriate next pixel. The one or more processors may be further configured to control a game using the path. The one or more processors may be further configured to determine the extremity point of the silhouette using the second distance field. The one or more processors may be further configured to determine a limb in the silhouette using the path. The one or more processors may be further configured to keep the path near a mid-line of the determined limb using the first distance field.

In one example, a system includes means for generating a first distance field relative to an edge of the silhouette; means for generating a second distance field relative to a location within the silhouette; and means for generating, based on the first distance field and the second distance field, a path from an extremity point of the silhouette to the location.

The system may include means for examining the first distance and second distance field for an appropriate next pixel. The system may include means for examining adjacent pixels to determine the appropriate next pixel. The system may include means for controlling a game using the path. The system may include means for determining the extremity point of the silhouette using the second distance field. The system may include means for determining a limb in the silhouette using the path. The system may include means for keeping the path near a mid-line of the determined limb using the first distance field.

In one example, a computer-readable storage medium comprises executable instructions that when executed by a processor cause the processor to effectuate operations. The effectuated operations may include generating a first distance field relative to an edge of a silhouette in an image. The effectuated operations may also include generating a second distance field relative to a location within the silhouette. The effectuated operations may further include generating, based on the first distance field and the second distance field, a path from an extremity point of the silhouette to the location.

The computer-readable storage medium may further comprise executable instructions that when executed by the processor cause the processor to generate the path by examining the first distance and second distance field for an appropriate next. The computer-readable storage medium may further comprise executable instructions that when executed by the processor cause the processor to examine adjacent pixels to determine the appropriate next pixel. The computer-readable storage medium may further comprise executable instructions that when executed by the processor cause the processor to control a game using the path. The computer-readable storage medium may further comprise executable instructions that when executed by the processor cause the processor to determine a limb in the silhouette using the path.

Alternatively, or in addition, the functionally described herein may be performed, at least in part, by one or more hardware logic components. For example, and without limitation, illustrative types of hardware logic components that may be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Computer-readable storage media may provide storage for instructions for the one or more processors. Although the description of computer-readable storage media contained herein refers to a mass storage device, such as a hard disk or CD-ROM drive, it should be appreciated by those skilled in the art that computer-readable media may be any available storage media.

By way of example, and not limitation, computer-readable storage media may include volatile and non-volatile, removable and non-removable media implemented in any method or technology for storage of information such as computer-readable instructions, data structures, program modules or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), BLU-RAY, or other optical storage, magnetic cassettes, magnetic tape, magnetic disk storage or other magnetic storage devices, or any other medium which may be used to store the desired information and instructions. For purposes of this specification and the claims, the phrase "computer-readable storage medium" and variations thereof, does not include waves, signals, and/or other transitory and/or intangible communication media.

It should be appreciated that any software components described herein may, when loaded into a processor and executed, transform the processor from a general-purpose computing system into a special-purpose computing system customized to facilitate the functionality presented herein. The processor may be constructed from any number of transistors or other discrete circuit elements, which may individually or collectively assume any number of states. More specifically, the processor may operate as a finite-state machine, in response to executable instructions contained within the software modules disclosed herein. These processor-executable instructions may transform the processor by specifying how the processor transitions between states, thereby transforming the transistors or other discrete hardware elements constituting the processor.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the architecture in order to store and execute the software components presented herein. It also should be appreciated that the architecture may include other types of computing devices, including hand-held computers, embedded computer systems, smartphones, PDAs, and other types of computing devices known to those skilled in the art. It is also contemplated that the architecture may not include all of the components shown in the figures, may include other components that are not explicitly shown in the figures, or may utilize an architecture completely different from that shown the figures.

Although the subject matter presented herein has been described in language specific to computer structural features, methodological and transformative acts, specific computing machinery, and computer-readable storage media, it is to be understood that the methods and devices defined in the appended claims is not necessarily limited to the specific features, acts, or media described herein. Rather, the specific features, acts, and mediums are disclosed as example forms of implementing the claims.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the technology be defined by the claims appended hereto.

What is claimed is:

1. A computer-implemented method comprising:
    detecting a user within a depth image and assigning a first segmentation value to each of a first plurality of pixels that correspond to the user in the depth image, wherein the first plurality of pixels that correspond to the user in the depth image comprise a depth-based silhouette;
    detecting an object within the depth image and assigning a second segmentation value to each of a second plurality of pixels that correspond to the object, wherein the second plurality of pixels in the depth image are not associated with the user;
    assigning a third segmentation value to a third plurality of pixels in the depth image that are not associated with the user or the object;
    generating a path, based at least in part on a first distance field and a second distance field, from an extremity point on the depth-based silhouette to a target location in the depth-based silhouette, wherein the first distance field indicates a first distance from within the depth-based silhouette to a silhouette edge of the depth-based silhouette, and the second distance field indicates a second distance from within the depth-based silhouette to the target location in the depth-based silhouette; and
    generating a pixel image representation of the depth-based silhouette depicting the path inside the depth-based silhouette for determining a limb in the depth-based silhouette.

2. The computer-implemented method of claim 1, wherein the third segmentation value is arbitrary.

3. The computer-implemented method of claim 1, wherein each pixel in the depth image has an assigned segmentation value.

4. The computer-implemented method of claim 1, wherein each pixel in the depth image has four assigned value comprising a horizontal value, a vertical value, a depth value, and a segmentation value.

5. The computer-implemented method of claim 1, further comprising assigning a depth value to each of the first plurality of pixels corresponding to the user, wherein the depth value corresponds to a distance between a capture device used to obtain the depth image and a portion of the user represented by each of the first plurality of pixels.

6. The computer-implemented method of claim 1, wherein the user is a human target.

7. The computer-implemented method of claim 1, wherein the first distance field and the second distance field are used to keep the path near a mid-line of the limb in the depth-based silhouette while moving towards the target location within the depth-based silhouette.

8. A system for creating silhouettes from a depth image comprising:
 memory; and
 a processor storing computer-readable instructions, which when executed by the processor, cause the system to:
  detect a user within a depth image and assign a first segmentation value to each of a first plurality of pixels that correspond to the user in the depth image, wherein the first plurality of pixels that correspond to the user in the depth image comprise a depth-based silhouette;
  detect an object within the depth image and associate a second segmentation value to each of a second plurality of pixels that correspond to the object, wherein the second plurality of pixels in the depth image are not associated with the user;
  assign a third segmentation value to a third plurality of pixels in the depth image that are not associated with the user or the object;
  generate a path, based at least in part on a first distance field and a second distance field, from an extremity point on the depth-based silhouette to a target location in the depth-based silhouette, wherein the first distance field indicates a first distance from within the depth-based silhouette to a silhouette edge of the depth-based silhouette, and the second distance field indicates a second distance from the target location in the depth-based silhouette to an edge of the depth-based silhouette; and
  generate a pixel image representation of the depth-based silhouette depicting the path inside the depth-based silhouette for determining a limb in the depth-based silhouette.

9. The system of claim 8, wherein the third segmentation value is arbitrary.

10. The system of claim 8, wherein each pixel in the depth image has an assigned segmentation value.

11. The system of claim 10, wherein each pixel in the depth image has four assigned value comprising a horizontal value, a vertical value, a depth value, and a segmentation value.

12. The system of claim 8, further comprising computer-readable instructions, which when executed, cause the processor:
 assign a depth value to each of the first plurality of pixels corresponding to the user, wherein the depth value corresponds to a distance between a capture device used to obtain the depth image and a portion of the user represented by each of the first plurality of pixels.

13. The system of claim 8, further comprising wherein the user is a human target.

14. The system of claim 8, wherein the first distance field and the second distance field are used to keep the path near a mid-line of the limb in the depth-based silhouette while moving towards the target location within the depth-based silhouette.

15. A computer-readable storage medium comprising computer executable instructions that when executed by a processor cause the processor to effectuate operations comprising:
 detecting a user within a depth image and assigning a first segmentation value to each of a first plurality of pixels that correspond to the user in the depth image, wherein the first plurality of pixels that correspond to the user in the depth image comprise a depth-based silhouette;
 detecting an object within the depth image and assigning a second segmentation value to each of a second plurality of pixels that correspond to the object, wherein the second plurality of pixels in the depth image are not associated with the user;
 assigning a third segmentation value to a third plurality of pixels in the depth image that are not associated with the user or the object;
 generating a path, based at least in part on a first distance field and a second distance field, from an extremity point on the depth-based silhouette to a target location in the depth-based silhouette, wherein the first distance field indicates a first distance from within the depth-based silhouette to a silhouette edge of the depth-based silhouette, and the second distance field indicates a second distance from within the depth-based silhouette to the target location in the depth-based silhouette; and
 generating a pixel image representation of the depth-based silhouette depicting the path inside the depth-based silhouette for determining a limb in the depth-based silhouette.

16. The computer-readable storage medium of claim 15, wherein the third segmentation value is arbitrary.

17. The computer-readable storage medium of claim 15, wherein each pixel in the depth image has an assigned segmentation value.

18. The computer-readable storage medium of claim 15, wherein each pixel in the depth image has four assigned value comprising a horizontal value, a vertical value, a depth value, and a segmentation value.

19. The computer-readable storage medium of claim 15, further comprising computer executable instructions that when executed by a processor cause the processor to effectuate operations comprising:
 assigning a depth value to each of the first plurality of pixels corresponding to the user, wherein the depth value corresponds to a distance between a capture device used to obtain the depth image and a portion of the user represented by each of the first plurality of pixels.

20. The computer-readable storage medium of claim 15, wherein the first distance field and the second distance field are used to keep the path near a mid-line of the limb in the depth-based silhouette while moving towards the target location within the depth-based silhouette.

* * * * *